United States Patent [19]

Besson

[11] Patent Number: 5,372,301
[45] Date of Patent: Dec. 13, 1994

[54] BIODEGRADABLE PACKAGING WITH POURING SPOUT

[75] Inventor: Jean-Paul Besson, Mercin Et Vaux, France

[73] Assignee: Saint Germain Cartonnage, Soissons, France

[21] Appl. No.: 82,106

[22] Filed: Jun. 28, 1993

[51] Int. Cl.5 .............................................. B65D 5/74
[52] U.S. Cl. ............................... 229/215; 229/125.04; 229/125.42
[58] Field of Search ................... 229/125.04, 125.09, 229/125.42, 214, 215, 217

[56] References Cited

U.S. PATENT DOCUMENTS

| | | | |
|---|---|---|---|
| 2,029,747 | 2/1936 | Venning et al. | 229/215 |
| 2,323,447 | 7/1943 | Chase | 229/125.42 |
| 2,330,464 | 9/1943 | Atterbury | 229/125.42 |
| 2,576,595 | 11/1951 | Goldstein | 229/214 |
| 2,634,897 | 4/1953 | Bord | 229/125.42 |
| 2,742,220 | 4/1956 | Lynes | 229/125.42 |
| 2,989,224 | 6/1961 | Umanoff | 229/217 |
| 3,204,250 | 8/1965 | Poole et al. | 229/125.42 |
| 3,568,910 | 3/1971 | McConnell . | |
| 3,989,171 | 11/1976 | Arneson | 229/125.04 |
| 4,054,240 | 10/1977 | LaPierre | 229/215 |
| 4,953,781 | 9/1990 | Bryan . | |

FOREIGN PATENT DOCUMENTS

| | | | |
|---|---|---|---|
| 788321 | 6/1968 | Canada | 229/215 |
| 92953 | 5/1962 | Denmark | 229/215 |
| 93999 | 6/1969 | France | 229/217 |
| 2106720 | 5/1972 | France . | |
| 713717 | 8/1954 | United Kingdom | 229/215 |

Primary Examiner—Gary E. Elkins
Attorney, Agent, or Firm—Young & Thompson

[57] ABSTRACT

Packaging of biodegradable material comprising a retractable pouring spout corresponding to a trapezoidal opening in the central region of one wall of the packaging. The large base of the opening is located on the side of the upper corners of the packaging. The retractable pouring spout is assembled from an external trapezoidal shape (19) corresponding to the opening and an internal assembly (24, 37) having a narrowed central portion (26) about which two lateral wings (25a, 25b) are articulated by lines (26a, 26b) oriented in the opposite direction from the sides (13, 15) of the trapezoidal shape (19). As a result, the wings (25a, 25b) have clearance with the sides (13, 15) of the trapezoidal opening (19), and the opening of the pouring spout takes place without friction of the lateral wings against the sides of the trapezoidal opening.

9 Claims, 3 Drawing Sheets

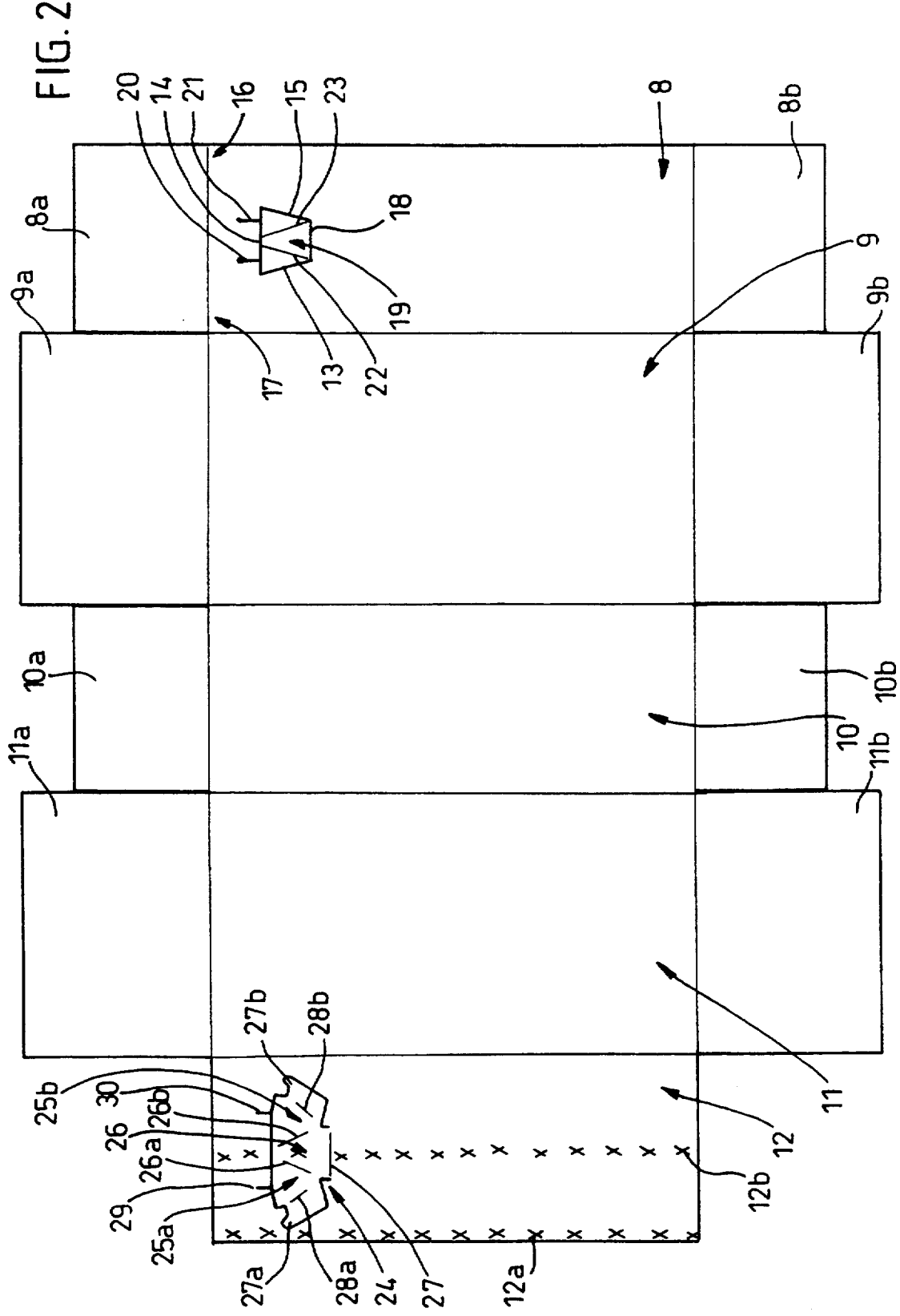

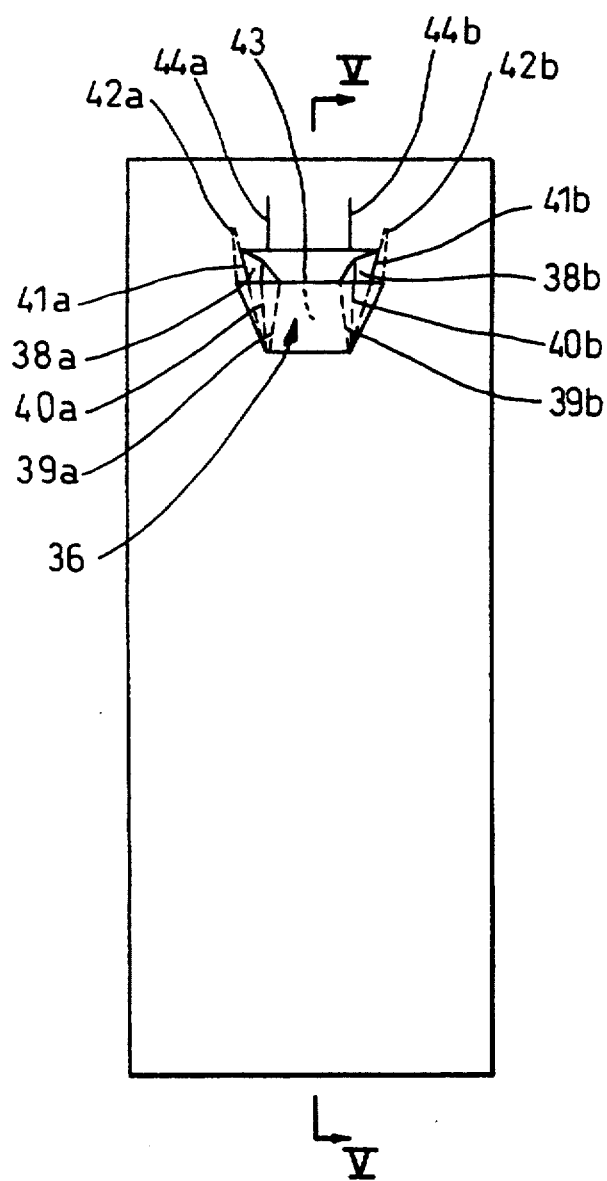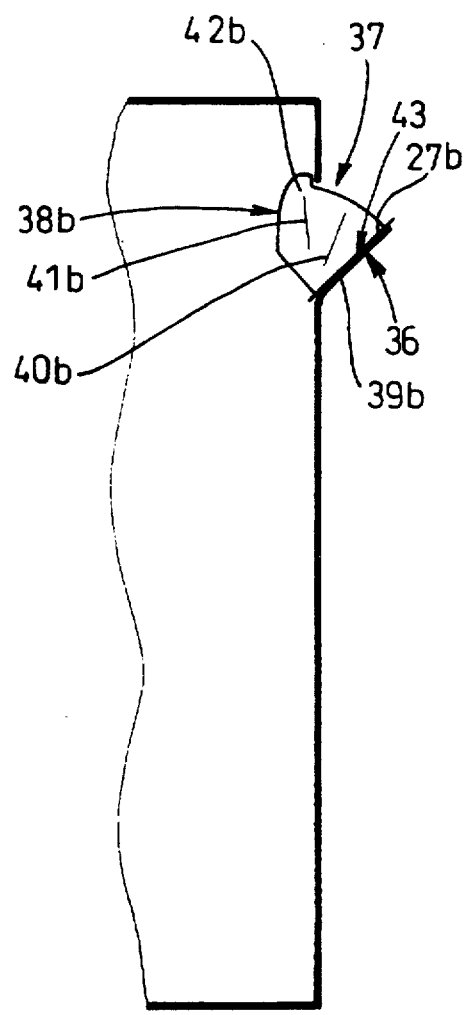

1

BIODEGRADABLE PACKAGING WITH POURING SPOUT

FIELD OF THE INVENTION

BACKGROUND OF THE INVENTION

The invention relates to a packaging of pliable biodegradable material, particularly cardboard, provided with a pouring spout.

Packages used particularly for handling consumable granular or pulverulent products such as for example: flour, sugar, rice, must be at the same time easy to use, low in cost and hermetically sealable.

There exists packaging comprising in the central region of one wall a substantially rectangular retractable pouring spout, of metal or a rigid material separate from the material of the packaging. This packaging is satisfactory but has the following drawbacks: on the one hand, during recycling of used packaging, the pouring spouts of rigid material cannot be recycled at the same time as the packaging of pliable material; on the other hand, when the packaging of biodegradable material is not recycled, the non-biodegradable pouring spouts constitute a source of pollution of the environment.

But when rectangular pouring spouts are made of cardboard, the resistance to crushing of the packaging decreases substantially because the pouring spout is not of a rigid material and does not contribute to the stability of the packaging.

The documents DE 38 32 544 C1 and DE-GM 74 12129 seek to overcome the reduction of resistance to crushing by connecting the rectangular pouring spout to the corners of the packaging. These solutions however dictate the positioning of the pouring spout or its dimensions and do not permit obtaining resistance to crushing upon piling of the packages to great heights, with a simple design and economical manufacture.

The document FR 2.106.720 describes a box for packaging of cardboard comprising an opening for sampling which can be closed by a pivotal closure flap forming in open position a pouring spout. The flap comprises a closure portion and two tongues pivoting about corresponding lines of articulation.

The document U.S. Pat. No. 3,586,910 describes a box comprising a retractable cardboard pouring spout on a wall of the box. This pouring spout has in its open position the shape of a small channel sliding on the corresponding edges of the opening; this pouring spout is not adapted to pouring powders or flour susceptible of flowing over the edges of the channel.

The document U.S. Pat. No. 4,953,781 describes a packaging box comprising a pouring spout of folded-back cardboard provided with a grasping tongue: the elasticity of the folds of this pouring spout gives rise to imperfect closure of the pouring spout and a loss of hermetic seal.

SUMMARY OF THE INVENTION

The invention has for its object to overcome the recited drawbacks by providing a packaging of simple conception, which will be strong and stackable to great heights, provided with a retractable pouring spout having no lateral friction and assuring sealed handling of the products contained therein.

The invention has for its object a packaging of biodegradable material such as cardboard, comprising a retractable pouring spout corresponding to a trapezoidal opening in the central region of one wall, the large base of the opening being situated adjacent the upper edges of the packaging, characterized in that the retractable pouring spout is assembled from an external trapezoidal shape corresponding to said opening and from an internal assembly having a narrowed central portion about which two lateral wings are articulated by means of lines oriented in the opposite direction from the sides of said trapezoidal shape, such that the wings have play relative to the sides of the trapezoidal opening, and that the opening of the pouring spout is effected without friction of the lateral wings on the sides of the trapezoidal opening.

According to other characteristics of the invention:
the central narrowed portion is in the shape of a trapezoid inscribed in and inverted with respect to said trapezoidal opening;
the trapezoidal external shape constitutes a grasping tongue of the pouring spout;
the lateral wings form between themselves an angle progressively decreasing away from the opening of the pouring spout;
two slots delimit in the wall, above the grasping tongue, a space of a width corresponding to the insertion of a finger and of a width less than the larger base of the grasping tongue;
the lateral wings comprise retainer lugs.

According to a first preferred modification of the invention, the assembly with two lateral wings is provided by cutting out one internal wall which is rendered integral by gluing or the like to the external wall in which is cut out and articulated the grasping tongue; above the assembly, a flexible region is provided in the internal wall by two spaced slots whose spacing is comprised between the spacing of the above slots of the grasping tongue and the length of the larger base of the grasping tongue.

The edges of the flexible region are preferably disposed staggered relative to the edges of the space above the grasping tongue to prevent any direct loss of packaged product.

According to a second modification of the invention, the assembly with the two lateral wings is a detachable member.

BRIEF DESCRIPTION OF THE DRAWINGS

The invention will be better understood from the description which follows given by way of non-limiting example with respect to the accompanying drawings, in which:

FIG. 2 shows a plan view of packaging according to the invention, flattened out.

FIG. 4 is an external elevational view of packaging according to the invention with the pouring spout open.

FIG. 5 is a partial cross-sectional view on the line V—V of FIG. 4 of packaging according to the invention with a pouring spout open.

DETAILED DESCRIPTION OF THE INVENTION

Figure 1:
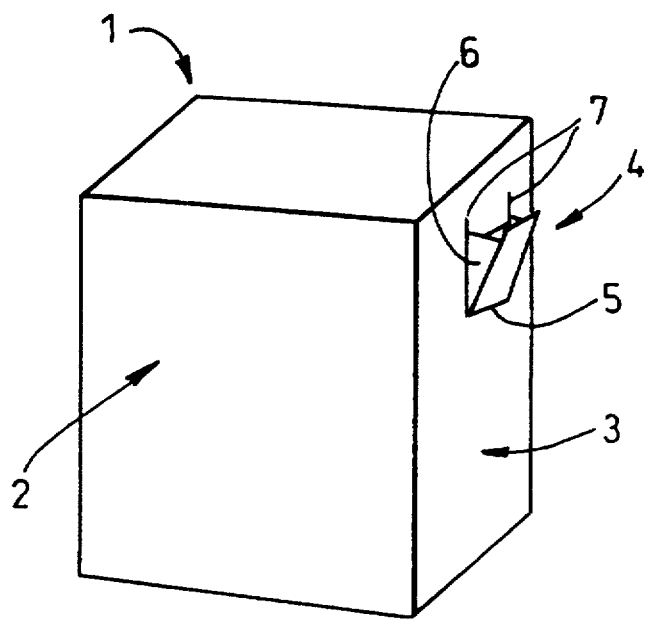
FIG. 1 is a schematic perspective view of packaging of known type.

Referring to FIG. 1, a packaging 1 of known type is present in the form of a substantially parallelepipedal box 2 of biodegradable or recyclable material, such as cardboard.

In the upper portion of a central region of one vertical surface 3, there is inserted a substantially rectangular pouring spout in a non-biodegradable material, such as aluminum or a rigid plastic material.

The pouring spout 4 pivots about its base 5 in the opening direction while separating two circular sectors 6 sliding with friction in slots 7 of the surface 3.

The height of the pouring spout 4 is such that it covers the height of the slots 7 in the closed position and the hermetic seal of the packaging 1 is thus ensured.

The friction of the circular sections 6 in the slots 7 prevents the accidental opening of the pouring spout 4 of the packaging 1 and hence preserves the contents.

With reference to FIG. 2, a packaging according to the invention is entirely constituted in pliable recyclable or biodegradable material such as cardboard.

The packaging according to the invention shown flattened out has four lateral sides 8, 9, 10, 11 visible after assembly, and a fifth lateral side 12 adapted to be glued along two gluing lines 12a, 12b to the back of the lateral side 8.

The packaging also comprises flaps 8a–11a, 8b–11b, adapted to be glued together to constitute, in known manner, the upper and lower sides of the packaging according to the invention.

In the central region of a side 8 corresponding to the side bearing the pouring spout, there is provided, a distance from the score lines corresponding to the edges of the packaging, weakened lines 13, 14, 15 delimiting a substantially trapezoidal opening.

The large base 14 of the trapezoidal opening corresponding to the pouring spout of the packaging according to the invention is situated between the upper corners 16, 17 of the packaging in a substantially symmetrical position.

The small base 18 of the trapezoidal opening is a score line adapted to constitute a hinge for a grasping tongue 19 of the pouring spout according to the invention.

The grasping tongue 19 is surmounted by two slots 20, 21 delimiting with the line of weakening 14 corresponding to the large base a space of a width corresponding to the insertion of a finger and less than the length of the line of weakening 14 corresponding to the large base of the trapezoidal opening.

The grasping tongue 19 comprises if desired two lines 22, 23 visualizing the direction of opening and of pouring of the pouring spout.

On the fifth side 12 adapted to be assembled for example by gluing along the two lines 12a, 12b to the back of the side 8 and at the interior of the packaging according to the invention, there is cut out an assembly 24 comprising two lateral wings 25a, 25b and a central portion 26 comprised between two lines 26a, 26b and which swings by a hinge constituted by a score line 27.

The central portion 26 narrows toward the upper side of the packaging and is limited by the lines of articulation 26a, 26b of the lateral wings 25a, 25b, oriented so as to converge toward the upper side of the packaging.

The central portion 26 of the assembly 24 is assembled to the grasping tongue 19 preferably by gluing such that the wings 25a, 25b pivot about their central portion 26 along the lines 26a, 26b, during successive opening and closing of the pouring spout.

The lateral foldable wings 25a, 25b comprise preferably retention lugs 27a, 27b and if desired lines 28a, 28b to render them flexible.

Two segments 29, 30 constitute transverse slots delimiting a flexible region above the central portion 26.

Figure 3:
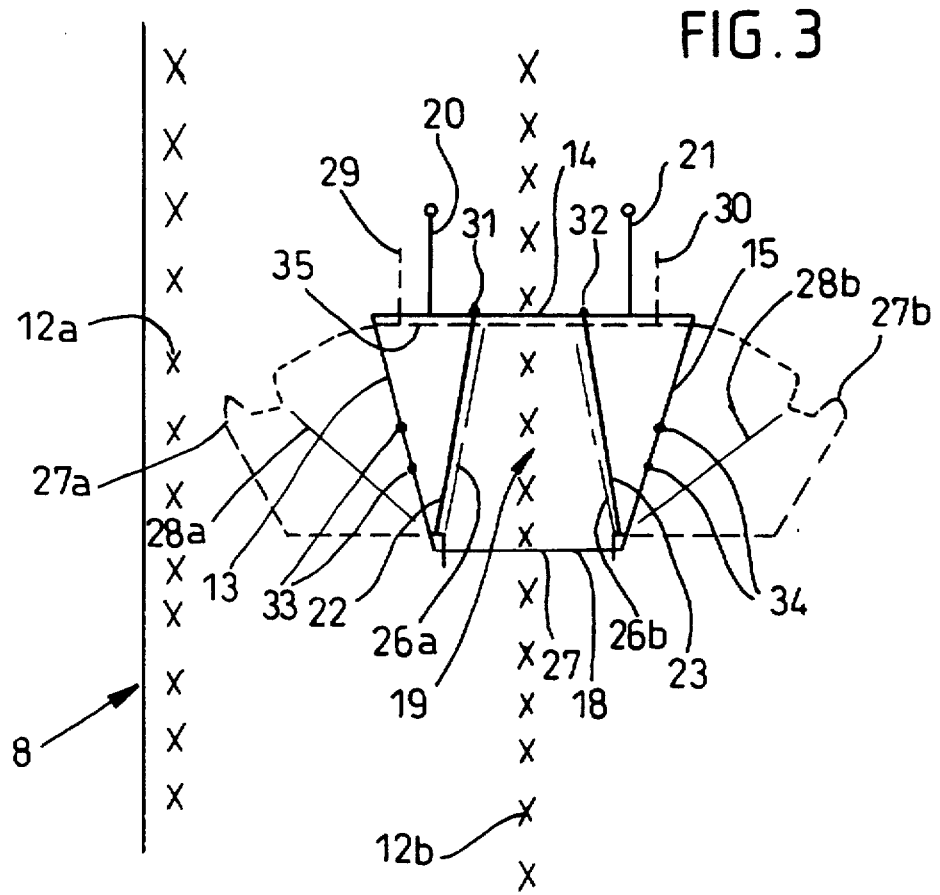
FIG. 3 is a partial view in plan of the external surface of packaging according to the invention after assembly.

Referring to FIG. 3, after assembly along the two glue lines 12a, 12b, the central portion 26 of the assembly 24 is glued to the grasping tongue 19 between the lines 22, 23.

According to the invention, the articulation lines 26a, 26b limiting the central narrowed portion 26 are oriented in the opposite direction from the sides 13, 15 of the outer trapezoidal opening, such that the wings 25a, 25b have substantial play in their articulation movement within the sides 13, 15 of the trapezoidal opening. In the illustrated example, the central narrowed portion 26 has the form of a trapezoid inscribed in and inverted relative to the trapezoidal opening: the large base of the central portion 26 corresponding to the small base 18 of the trapezoidal opening.

The grasping tongue 19 is integral with the side 8 at points of attachment 31, 32, 33, 34 located on the lines 14, 13, 15, respectively.

By simple pressure of the finger between the slots 20 and 21, there is effected a breaking of the points of attachment 31 and 32.

Then by inserting the finger in the space comprised between the slots 20 and 21, and the interior of the flexible region delimited by the segments 29 and 30, one pulls outwardly on the grasping tongue 19 and effects the progressive rupture of the attachment points 33 and 34 and the freeing of the grasping tongue 19.

Because of the inclination of the sides 13 and 15 of the trapezoidal opening relative to the direction of pulling, the opening by successive rupture of the points of attachment such as 33 and 34 is progressive and requires much less force than in the case of a rectangular opening, where all the points of attachment are aligned with the direction of pulling.

According to the invention, it will be seen that the length of the large base 14 is greater than the width of the flexible region delimited by the slots 29 and 30, which is greater than or equal to the width of the space corresponding to the insertion of a finger between the slots 20 and 21: in this way, one can act on the flexible region by inserting a finger between the slots 20 and 21 without initiating tearing of the packaging according to the invention.

By thus positioning the grasping tongue 19 in the side 8, the tongue 19 corresponds exactly to the contour of the trapezoidal opening produced in the packaging according to the invention and ensures its sealed closure.

The margins of the assembly 24 and the slots 29 and 30 are preferably disposed offset relative to the slots 20 and 21 and to the contour of the grasping tongue 19, particularly along the large base 14.

This offset arrangement is obtained in known manner by the choice of the dimensions and positioning of the different corresponding transverse lines of incision: this offset arrangement ensures good sealing of the packaging according to the invention.

Moreover, when the pouring spout is closed, the grasping tongue 19 merges with the wall of the packaging without extending beyond the lateral side 8 in which it is provided and cannot be pushed inwardly of the packaging because the tongue 19 comes to bear by its large base 14 against an abutment constituted by an edge 35 of the fifth side 12.

The embodiment described in reference to FIGS. 2 and 3 constitutes a first preferred form of the invention, in which the assembly with two lateral wings is provided by cutting out an internal wall integrated by gluing or the like to the external wall in which is cut out and articulated the grasping tongue.

There will now be described a packaging according to the invention whose manner of operation corresponds not only to the first preferred embodiment but also to a second embodiment in which the assembly with the two lateral wings is a separate member made integral by gluing to the grasping tongue.

In this second embodiment of the invention, the corresponding pouring spout has at its central portion a thickness greater than that of the wall in which it swings by the small base of a substantially trapezoidal opening.

The slots corresponding to the slots 20 and 21 of FIG. 3 are found in this embodiment, while the slots 29 and 30 cannot be provided in the absence of an internal wall.

Upon pulling on the grasping tongue 19, the inclination of the lateral sides such as 13 and 15 permits progressive and easy opening because after opening, the lateral wings such as 25a, 25b pivot while sliding freely about the lateral sides 13 and 15 and effect the raising of the lugs 27a, 27b toward the interior of the packaging according to the invention.

According to the invention, the sliding with friction of the substantially rectangular pouring spouts of known type is thus totally avoided, giving way to a progressive and easy opening by pivoting and sliding of the lateral wings forming between themselves a dihedral angle diminishing progressively from the opening of the pouring spout according to the invention: this angle diminishes from 180° to about 60°.

With reference to FIGS. 4 and 5, a packaging according to the invention comprises a pouring spout in open position.

The pouring spout comprises a substantially trapezoidal grasping tongue 36 pivoting on one external wall for example by its small base.

An assembly 37 comprises two lateral wings 38a, 38b with score lines 39a, 39b; 40a, 40b; 41a, 41b; two retention lugs 42a, 42b; and a central portion 43 integral with the substantially trapezoidal tongue 36. The score lines 39a to 41b are provided to facilitate the raising of the wings 38a, 38b during their pivoting about the edges of the trapezoidal opening.

The opening of the pouring spout is achieved by insertion of a finger between the slots 44a and 44b, and by pulling on the grasping tongue 36.

The traction on the tongue 36 effects the opening of the pouring spout and involves the formation of folds corresponding to the score lines 39a to 41b, until the retention lugs 42a and 42b come into abutment with the upper corners of the opening of a contour corresponding to that of the trapezoidal tongue 36.

The packaging according to the invention is of simple conception and can be made in an economical way on existing production machines.

The packaging with pouring spout according to the invention has resistance to crushing analogous to that of corresponding packaging without pouring spouts, despite the fact that in general the presence of a pouring spout decreases the resistance of a package.

Although the invention has been described with reference to a particular embodiment, it is not thereby limited and includes on the contrary all variations of shape and execution within the scope and spirit of the invention: in particular, the invention is applicable to packaging with lateral wings of any shape comprising or not incision lines or score lines.

What is claimed is:

1. Packaging of biodegradable material comprising: a retractable pouring spout corresponding to a trapezoidal opening in a central region of a lateral wall of the packaging, said trapezoidal opening having a large base, and two sides slanted in opposite directions, said large base being located between upper corners of the packaging, said retractable pouring spout being assembled from an external trapezoidal shape corresponding to said opening and an internal assembly having a central portion about which two lateral wings are articulated by means of lines slanted in directions opposite from the sides of said trapezoidal opening, such that the wings have clearance with said sides, said pouring spout is adapted to be opened without substantial friction of the lateral wings against the sides of the trapezoidal opening, said external trapezoidal shape constituting a grasping tongue for the pouring spout, said lateral wall having two slots above the grasping tongue, said slots defining a spacing having a width sufficiently wide to permit insertion of a human finger, and said width being smaller than the large base of the trapezoidal opening.

2. Packaging according to claim 1, wherein the central portion of the internal assembly is a trapezoid inscribed in and inverted relative to said trapezoidal opening.

3. Packaging according to claim 1, wherein the lateral wings form between themselves an angle decreasing progressively outwardly of the pouring spout opening.

4. Packaging according to claim 1, wherein the lateral wings bear retention lugs.

5. Packaging according to claim 1, further including an internal wall affixed to said lateral wall, and said internal assembly adapted to be extracted from said internal wall by tearing out said internal wall.

6. Packaging according to claim 5, further including a flexible zone located in the internal wall above the internal assembly, said flexible zone having two slits spaced apart a distance comprised between the spacing of the slots above the grasping tongue and the length of the large base of the trapezoidal opening.

7. Packaging according to claim 6, wherein the flexible zone includes edges which are disposed offset relative to edges of the spacing above the grasping tongue.

8. Packaging according to claim 1, wherein the internal assembly is a separate piece.

9. Packaging of biodegradable material comprising: a retractable pouring spout corresponding to a trapezoidal opening in a central region of a lateral wall of the packaging, said trapezoidal opening having a large base and two sides slanted in opposite directions, said large base being located between upper corners of the packaging, said retractable pouring spout being assembled from an external trapezoidal shape corresponding to said opening and an internal assembly having a central portion about which two lateral wings are articulated by means of lines slanted in directions opposite from the sides of said trapezoidal opening such that the wings have clearance with said sides, and said pouring spout is adapted to be opened without substantial friction of the lateral wings against the sides of the trapezoidal opening, said lateral wall including two slots above the trapezoidal shape, said slots defining a spacing between them, said spacing being sufficiently wide so as to permit insertion of a human finger, said spacing being smaller than the large base, said lateral wall having an internal wall affixed thereto, and said internal assembly adapted to be extracted from said internal wall by tearing said internal wall, a flexible zone located in the internal wall above said internal assembly, said flexible zone having two slits spaced apart a distance comprised between the spacing of the slots above the trapezoidal shape and the length of the large base of the trapezoidal opening.

* * * * *